United States Patent Office 3,442,648
Patented May 6, 1969

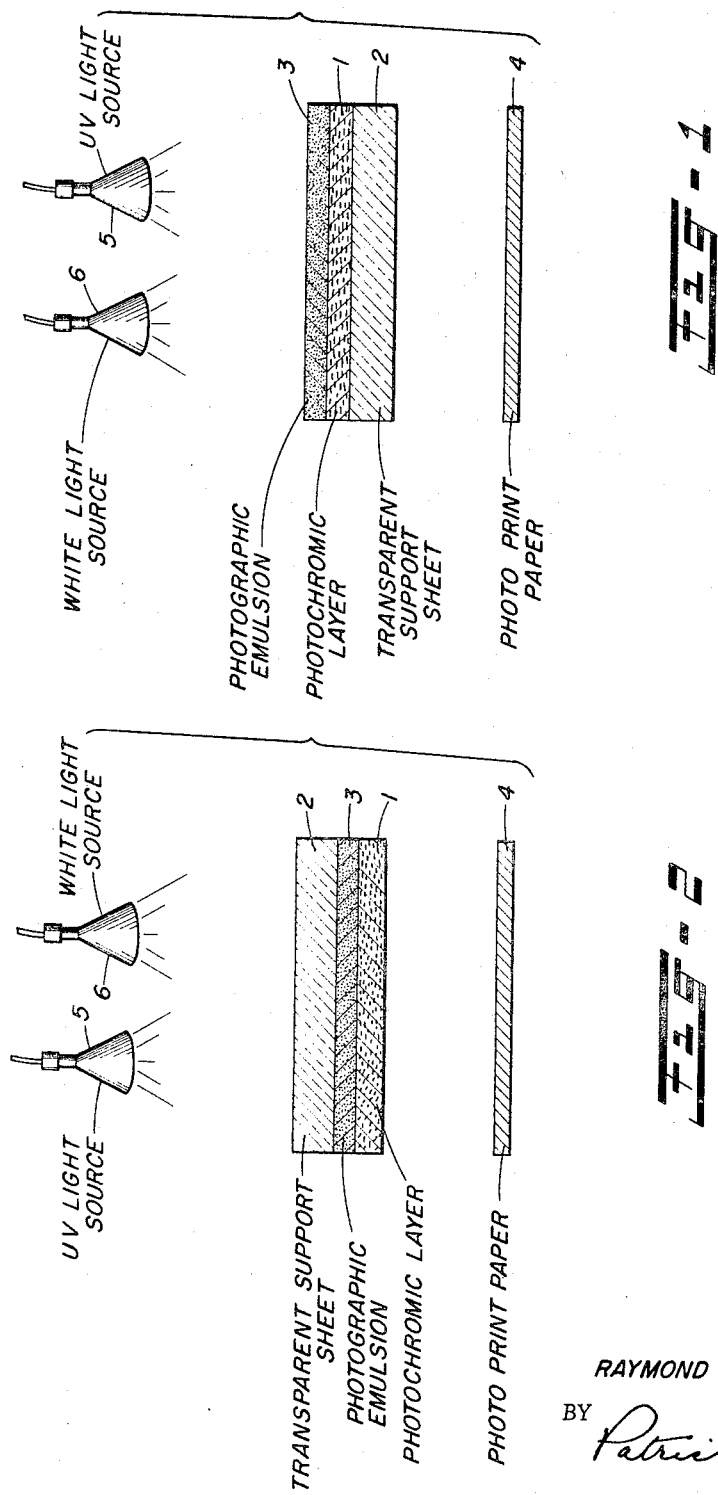

3,442,648
PHOTOGRAPHIC DODGING METHOD
Raymond John Dunsford Smith, Bethel, Conn., assignor to American Cyanamid Company, Stamford, Conn., a corporation of Maine
Filed June 16, 1965, Ser. No. 464,412
Int. Cl. G03c 5/06, 1/76
U.S. Cl. 96—44                              4 Claims

ABSTRACT OF THE DISCLOSURE

A method of dodging photographic film using an article of manufacture which is a photographic film comprising, in permanent integral laminated arrangement, a substantially transparent support sheet, a photochromic layer and a photographic emulsion layer in direct contact with said photochromic layer.

---

This invention relates to materials and methods for photographic dodging. More particularly, the invention pertains to negative photographic film which when used to produce a reversal or positive image therefrom has the built-in capability of attenuating, emphasizing or correcting the density scales or variations which are normally lost, deemphasized or overemphasized during printing or projection of the positive image. The invention further pertains to a method of photographic dodging utilizing said photographic negative film having a built-in capability for photographic dodging.

In order to attenuate or sharpen foreground and background detail in positive prints or projected positive images produced from photographic negative film or transparencies, it has become conventional to employ the technique known as photographic dodging. The technique is useful for interpretation of fine detail because of the incapability in photographic positive printing paper or projection screens of precisely reflecting the subtle variations in density of the negative film image. The problem of obtaining a projected or a positive print image of greater definition may also be described as the problem of improving the contrast capability, i.e., the visualization of fine details in large areas of radically different densities in the same negative image and the minimization of unevenness in the negative image due to errors in technique such as uneven development and uneven lighting.

At least five photographic dodging methods are known. They are termed "dodging" techniques because in each the portions of the printing or positive image projection light is blocked, avoided or "dodged" in order to improve the positive image.

In one method, the operator imposes an opaque cutout between the light source employed and the low density areas of a negative to be corrected during the printing or enlarging process thereof, thereby selectively reducing the duration of exposure of the light-sensitive layer to be exposed in registration with such low density areas. By suitably locating such a cutout those areas of the photosensitive printing paper in registration with the low density areas of the negative are exposed to the light source for shorter periods of time thereby decreasing the contrast variations between the areas of the resulting positive image.

In a second method, the same result is often obtained manually by an operator passing his hands back and forth in the printing light between the negative film or transparency and the positive printing paper. However, each of the latter techniques are inaccurate and unreliable since they depend too greatly on an operator's timing and dexterity.

A third correction method involves first printing an underexposed positive image mask from an original negative. Then the resulting positive mask is superposed in registration with the negative during contact printing or enlarging. This dodging procedure is time consuming and it is difficult to secure precise registration of the original negative and the processed positive mask.

A fourth method for the dodging of photographic negatives involves the use of an electronic scanning device. However, the device is expensive and often results in a halo effect in the image.

In a fifth method of photographic dodging, as exemplified by U.S. Patents 3,105,761 to Foris and 3,160,504 to Montani, a photochromic layer affixed to a supporting sheet of material or which is self-supporting by incorporation in or on a transparent film such as an acetate, polyester or acrylic plastic material, is first exposed to light of one wave length through the negative film or transparency to produce a masking image and thereafter the masking photochromic layer in register with the negative film is exposed to actinic light to produce a corrected positive print. The Montani method is an improvement over the Foris technique in that actinic light of a critical intensity is employed in critical exposure time to reduce the tendency of the masking image to bleach, thereby facilitating repeated printing from the same negative film and mask in register.

While the fifth method of photographic dodging described above has many advantagse, it nevertheless suffers from certain defects. First, the negative film or transparency and the photochromic layer is each a separate sheet or layer thereby prohibiting precise register of negative film and photohcromic layer even when conventional mechanical means such as clamps and the like are employed. The precise and immovable register of negative film and photochromic layer is of great importance in the automatic and uniform dodging of large numbers of negatives or of rolls of movie film. The absence of accurate register or disturbance of the layers will of course result in the necessity of erasing and reexposing the photochromic layer to impart a new masking image.

Secondly, it would be desirable to be able to reduce or regulate the thickness of the photochromic layer so as to decrease or regulate the defraction of light during the printing process, thereby permitting achievement of greater clarity or regulation of clarity in the final print. This becomes of particular importance when the combination of negative film and photochromic layer is to be used for high resolution enlarging.

Thirdly, unexposed or exposed negative photographic film having a builtin capability of being dodged would be useful as it would permit the operator to dodge by activation of the photochromic layer when and as long as he sees fit without having to superpose the negative film and the photochromic layer to reinstitute the original register. This would be beneficial, for example, when printing or projecting certain frames from the numerous pictures in a roll of developed movie film when it is desired to examine certain of the frames by activation of a photochromic layer to resolve foreground or background detail. Such flexibility of operation will therefore permit at the discretion of the operator dodging, no dodging at all or repeated dodging.

It is therefore an object of the present invention to provide as an article of manufacture unexposed or exposed negative film which permits precise and semipermanent register of the negative photographic film and a photochromic layer thereby avoiding disturbance of said register and the consequent inconvenience of having to erase and reexpose the photochromic layer to photochromic activating light.

It is a further object of the invention to provide as an article of manufacture for photographic dodging photographic film having a photochromic layer wherein the light scatter normally occurring in the space between photochromic layer and photographic emulsion layer is substantially reduced or eliminated and the thickness of the layers may be regulated so as to permit decreased defraction and uniformly greater clarity in projected images or positive prints produced therefrom.

Still another object of the invention is to provide as an article of manufacture for photographic dodging photographic film which permits flexibility and convenience of operation, e.g., allows the operator as he sees fit to dodge, not to dodge or to repeat dodging.

Yet another object of the invention is to provide a method of photographic dodging employing as an article of manufacture negative photographic film having a photochromic layer which is at all times in perfect register with the unexposed or exposed photographic emulsion thereby preventing disturbance of said register during projection or printing.

These and other objects and advantages of the invention will become apparent from the description which follows.

In accordance with the invention there is provided as an article of manufacture photographic film comprising in unitary or integral sandwiched or laminate arrangement a substantially transparent support sheet, a photochromic layer and a photographic emulsion in direct contact with said photochromic layer.

The instant photographic film and method of dodging differ essentially from the invention disclosed in U.S. application Ser. No. 464,301, filed, on the same day. The invention of the copending application is described as being useful in the "unsharp mask" technique of photographic dodging. This technique involves the formation of an out-of-focus positive masking image on a photochromic layer by irradiating the photochromic layer with ultraviolet light through a photographic emulsion layer carrying a negative image, said photochromic layer and negative image layer being separated or "spaced" by a transparent support sheet. The photochromic layer, transparent supporting sheet and negative image-bearing photographic emulsion layer form an integral sandwich. The correct amount of out-of-focus (unsharp masking image) is achieved by regulating the thickness of the central transparent support sheet or "spacer." When this integral sandwich is used in the conventional manner to form a positive image on a projection screen or photographic print paper, the printing or projection light is "dodged," i.e., the light is avoided or attenuated by the unsharp masking image on the photochromic layer. The resulting positive image will have sharpened small detail and somewhat increased contrast and much of the density difference between large detail areas will be retained. The overall range of densities is therefore said to be increased or improved.

It is known that a positive image printed or projected from a masked negative image will have an even greater increase in small detail sharpness and contrast if the transparent support sheet or spacer is eliminated during the printing or projection of the positive image. Although this is always achieved at the expense of the density difference or contrast between large detail areas, the effect is advantageous when it is desired to sharpen or bring out fine detail as in precision photography, e.g., aerial mapping and the like.

The present invention includes certain features of the copending application, namely, the unitary sandwich arrangement of photochromic layer, photographic emulsion and substantially transparent support sheet with the resulting benefits of perfect register, but differs essentially in that the photographic emulsion (or residue thereof after exposure and developing) is in substantially direct contact with the photochromic layer. By "direct contact" is meant that the photographic emulsion is uniformly and substantially permanently affixed to the photochromic layer so as to produce a unitary sandwich structure with the photochromic layer and support sheet. Two arrangements of these three members are possible. In the first arrangement (FIGURE 1 hereinafter) the photochromic layer is adjacent the support sheet. In the second arrangement (FIGURE 2 hereinafter) the emulsion layer is adjacent the support sheet.

The consequence of substantially direct contact of photographic emulsion layer and photochromic layer is greatly increased small detail sharpness and contrast and reduced large detail density difference in the positive image printed or projected by means of the sandwich, the photographic emulsion of which has been exposed and developed in the conventional manner followed by formation of a masking image on the photochromic layer.

Since the photographic emulsion is in substantially direct contact with the photochromic layer, the masking image formed on the photochromic layer will be relatively sharp as compared to that formed on the photochromic layer of the film of the copending application. For this reason, the present technique may be described as a "sharp mask" technique of photographic dodging by contrast with the method of the copending application.

One embodiment of the photographic film of the present invention is conveniently prepared by forming a photochromic layer on a transparent sheet which thus serves as a support for the photochromic layer and the photographic emulsion and thereafter coating the photochromic layer with a conventional photographic emulsion, e.g., a dispersion of a silver halide salt such as silver bromide in gelatin. A second embodiment may be prepared by coating a transparent sheet with the photographic emulsion and then forming the photochromic layer on the photographic emulsion. By a "photochromic layer" is meant the substantially uniform distribution of a photochromic material, alone or in a medium not required for photochromic activity, over the photographic emulsion. The important result is contact of photochromic material and photographic emulsion such that substantially no finite distance exists between photochromic material and silver halide emulsion. As already mentioned, this relationship substantially eliminates light scatter between the photographic emulsion and photochromic layer, resulting in a relatively sharp masking image and ultimately a positive image having greatly improved small detail sharpness and contrast.

The support sheet may be any of the materials commonly employed in the photographic art as receiving sheets or webs for silver halide photographic emulsions. Suitable support sheet materials include, for example, glass and substantially transparent thermoplastic substrates such as cellulose or cellulosic derivatives, e.g., cellulose acetate, cellulose butayrate, cellulose acetate butyrate, polymethyl methacrylate, polyethyl methacrylate, polybutyl methacrylate, polystyrene, polyvinyl chloride, polyvinyl acetate and the like. High optical quality is preferred but not critical. These sheets may be employed in thickness of from about 1 to 25 mils, preferably 5 to 20 mils, depending on the degree of flexibility desired in the photographic film.

A great variety of photochromic materials useful in the present invention are known in the art. By photochromic material is meant an organic or inorganic compound or mixture thereof with other materials which exhibits a reversible change in absorption spectrum upon irradiation with specific wave lengths of light. The photochromic or phototropic material must be reversible, i.e., upon removal of the activating radiation, the material must revert to its original state. Of particular interest in the present invention are photochromic materials which undergo a reversible color change when irradiated with light of a wave length below about 550 millimicrons and preferably in the range of from about 300 to 400 millimicrons (ultraviolet light range). The preferred materials revert back or bleach to the colorless state when the activating light is removed or when heated.

Representative photochromic organic compounds include the following: anils, e.g., salicylidene-2-chloroaniline, 5'-chlorosalicylidene-aniline, and the like; aromatic nitro compounds, e.g., 2-(2',4'-dinitrobenzyl)pyridine, o-nitrotoluene, and the like; bianthrone and related compounds, e.g., xanthylidineanthrone, and the like; indenone oxides, e.g., of the formula

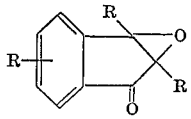

(R=alkyl, aryl, etc.), e.g., 2,3-diphenylindenone oxide, and the like; spiropyrans, e.g., of the formula

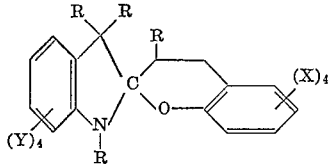

(X and Y=hydrogen, nitro, alkoxy, halo, etc.) (R=hydrogen, alkyl, etc.), i.e., those compounds set forth in copending U.S. application, Ser. No. 239,333, Patent No. 3,212,898, filed Nov. 21, 1962; cyclopent-4-en-1-one compounds of the formula

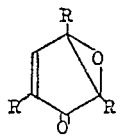

wherein R is substituted phenyl, substituted pyridyl, or a lower alkyl radical and said substituents are hydrogen, lower alkoxy, lower alkyl, nitro, cyano, halo, or alkoxy carbonyl radicals, such as those set forth in copending U.S. application Ser. No. 312,850, Patent No. 3,329,502, filed Oct. 1, 1963; dithizonates, such as mercury bis-dithizonate and those set forth in copending U.S. application Ser. No. 323,580, filed Nov. 14, 1963, and the like; and miscellaneous classes of organic compounds such as Ar—N=N—Ar, Ar$_3$C—CN (Ar=aryl), compounds of the formulas

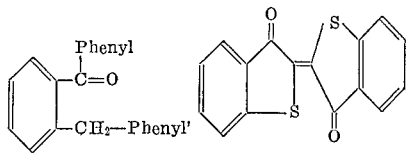

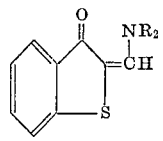

(R=alkyl, aryl, etc.)

N-4-hydroxybenzylideneaniline,
m-chloro-N-o-nitrobenzylideneaniline,
p-salicylideneaminobenzoic acid,
N-salicylideneaniline,
N-salicylidene-p-anisidine,
N-salicylidene-m-toluidine,
N-o-nitrobenzylidene-p-phenetidine,
anisaldehyde phenylhydrazone,
1-(p-methoxyphenyl)-1-penten-3-one semicarbazone,
cinnamaldehyde thiosenicarbazone,
fulgides, e.g., of U.S. Patent 2,305,693; β-tetrachloroketonaphthalene; and the compounds described in copending U.S. applications Ser. Nos. 418,328, Patent No. 3,331,859, 418,337, 418,336, Patent No. 3,331,854, 418,- 295, and 418,294, Patent No. 3,321,491, all filed Dec. 14, 1964.

Included among inorganic photochromic materials are transition metal compounds admixed with oxygen-containing thermoplastic resins prepared from ethylenically unsaturated monomers including mixtures of different monomers. The transition metal compounds are those of the formula $$MX_mO_n(OR)_p \qquad (I)$$

wherein M is a transition metal; X is a halogen; R is an alkyl radical having 1–12 carbon atoms inclusive, an aryl radical having from 6–10 carbon atoms, inclusive, a

radical wherein R' is an alkyl radical having from 1–12 carbon atoms, inclusive, or an aryl radical having from 6–10 carbon atoms, inclusive; $m$ and $p$ are whole, positive integers of from 0–6, inclusive; and $n$ is a whole, positive integer of from 0–2, inclusive; the total of $2n+m+p$ being equal to the valence of the metal M, at least one of $m$ and $p$ being an integer of at least 1.

Typical of such compounds are: titanium tetrachloride, titanium oxide dichloride, titanium tetramethoxide, titanium oxide dimethoxide, titanium dichloride dimethoxide, zirconium tetrachloride, zirconium oxide difluoride, zirconium tetraphenoxide, tungsten hexachloride, tungsten oxide tetrachloride, tungsten dioxide dichloride, tungsten hexabromide, tungsten oxide tetrabromide, tungsten hexamethoxide, tungsten oxide tetrabenzoate, tungsten pentachloride methoxide, hafnium tetrachloride, hafnium oxide dichloride, hafnium chloride triphenoxide, tantalum pentachloride, tantalum oxide trichloride, tantalum pentafluoride, tantalum pentamethoxide, chromium dioxide dichloride, chromium dioxide dimethoxide, vanadium oxide trichloride, vanadium dioxide bromide, vanadium dioxide methoxide, niobium pentachloride and the like. These and other materials of this type are disclosed together with oxygen-containing polymers in copending U.S. application Ser. No. 399,073, filed Sept. 24, 1964.

Other organic and inorganic photochromic materials, including individual compounds as well as mixtures or reaction products with other materials, useful in the present invention are materials such as described in Advances in Photochemistry, Interscience Publishers (1963), pages 280–321. All of the above patents, patent applications and publications are incorporated herein by reference.

It will be understood that some of the photochromic materials enumerated herein and in the aforementioned references will be more useful than others by reason of photochromic activity at ambient temperatures, more rapid color change or color change in response to narrower ranges of wavelength or lower intensity of photochromically activating light. However, given the present disclosure one skilled in the art can conveniently choose the photochromic material giving optimum results for the desired end use.

Any means effective for affixing a photochromic layer to the substantially transparent support sheet directly or over the photographic emulsion may be employed. Such means will, of course, depend upon the type of photochromic material used. Such means include any of the conventional coating techniques whereby a photochromic compound is dispersed in a solvent or resin or mixture of the two and the resulting solution formed on the support sheet directly or over the photographic emulsion. Any coating technique may be employed such as flow coating, spraying, dipping and the like. When the nature of the photochromic compound permits, the photochromic layer may be affixed by vacuum deposition.

Of particular interest in the present invention are photochromic layers fixed to the photographic emulsion or support sheet by the evaporation of solvent from a film-forming resin containing a photochromic compound. The resins include any of the optical quality thermoplastic resinous materials such as polymethyl methacrylate, polyethyl methacrylate, polybutyl methacrylate, polystyrene, polyvinyl chloride, polyvinyl acetate, cellulose acetate, and cellulose acetate butyrate. These organic film-forming materials may be employed as monomers, as partially polymerized materials or as polymers. From about 0.01 to 20%, preferably 0.1 to 10%, by weight of the photochromic compound in the organic film-forming carrier is generally suitable. Particular compositions of these types and techniques for affixing the photochromic layer to a transparent sheet, applicable herein, are known in the art, e.g., French Patent 1,329,982 to Wagner et al. and U.S. Patent 3,105,761 to Foris.

The thickness of the photochromic layer may vary depending upon the choice of photochromic material and method of applying the photochromic layer to the photographic emulsion or directly to the support sheet. Generally, thickness of from about 0.1 to 5 mils and preferably from about 0.3 to 1.2 mils will be suitable. Greater thicknesses may result in a tendency of the photographic film to crease or crack or excessive actinic light refraction when producing the positive prints or images. Too thin layers, on the other hand, may result in a nonuniform photochromic layer or insufficient concentration of photochromic compound to provide efficient dodging.

The thickness of the photographic emulsion is not critical and will be in the range generally considered useful in the art, e.g., from about 0.3 to 0.5 mil, more or less.

Included in the scope of the invention is photographic film as an article of manufacture wherein the silver halide emulsion has not been exposed to image bearing actinic light as well as photographic film carrying an exposed and developed photographic emulsion layer, i.e., a residue comprising a negative image. The former article could be marketed as unexposed negative film. Once a negative image is imparted to the film it may subsequently be masked by activation of the photochromic layer prior to, or simultaneously with, printing or projection of the positive image.

The method of photographic dodging of the invention comprises exposing the photochromic layer of the above-described photographic film to ultraviolet or other photochromically activating light through the negative image previously imparted by image-bearing actinic light to the photographic emulsion. By virtue of this step a masking image of the negative image is formed in the photochromic layer.

In the second step of the method (performed after or simultaneously with the first step), a photosensitive sheet, i.e., positive printing paper, is exposed to actinic light through the unitary photographic film carrying both the negative image and the masking image. There results on the photosensitive sheet a positive image having a modified density scale as compared to the density scale which would result from merely forming a positive print from the negative image alone, i.e., a negative image which has not been masked with the photochromic layer. Described otherwise the result is to soften the large area contrast while substantially improving fine detail sharpness and contrast. Since the masking photochromic layer is at all times in perfect register with the negative image-containing layer no problem is encountered in making numerous uniform prints from the same masked negative or in printing frames from a roll of film. Moreover, if the desired degree of dodging is not initially provided, the photochromic layer may be bleached and the masking step repeated.

It will be appreciated that the instant article of manufacture and method of dodging permit not only the preparation of individual prints having modified density scales, but also provide a means of projecting an image from movie film or slide transparencies, as onto a projection screen, in which each frame may be dodged uniformly and in a predetermined degree depending upon the thickness of the photochromic layer throughout the entire length of the film roll or series of slides. Unusual effects may also be accomplished by the technique of projecting a positive image onto photosensitive printing paper or a projection screen in which both actinic light and ultraviolet light are passed simultaneously through the negative image and photochromic layer. In this way the density scale of the positive image is being modified at the same time it is being printed or projected by the nonphotochromic activating light.

The subject matter of copending application Ser. No. 464,301 is incorporated herein by reference.

In order that the present invention may be more completely understood, the following examples are given in which all parts by weight unless otherwise specified. These examples are set forth primarily for the purpose of illustration and any specific enumeration of detail contained therein should not be interpreted as a limitation on the case except where indicated in the appended claims.

Example 1

A photochromic coating solution is prepared containing polymethyl methacrylate at 20% resin solids dissolved in a 3:1:4 by volume solvent mixture of methylethyl ketone, methylisobutyl ketone and toluene, respectively, and 7% by weight on the resin of 1,3,3-trimethyl-6'-nitro-spiro (2'H-1'-benzopyran-2,2'-indoline), i.e.,

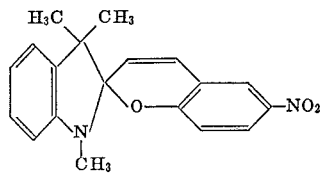

This solution is drawn down with a doctor knife onto 3 mil thick commercially available transparent polyester film. The solvent mixture is then evaporated leaving a photochromic layer on the film of about 1 mil in thickness. The resultant photochromic film layer is then coated with a commercially available silver bromide-gelatin photographic emulsion.

The resulting photographic film sandwich is illustrated by FIGURE 1 of the accompanying drawing in which 1 is the layer comprising the photochromic material remaining on the transparent support sheet 2 (transparent polyester film of the instant example) after evaporation of the solvent from the mixture of solvents, polymethyl methacrylate and indoline compound and 3 is a conventionally developed negative image-producing residue of a silver halide photographic emulsion.

Example 2

Again with reference to FIGURE 1, the photographic film sandwich of Example 1 is placed in a photographic enlarger in the normal position with respect to positive print paper 4 and is then irradiated with an ultraviolet light source 5 until a reversal image (mask) of the photographic negative image having the desired density is formed on the photochromic layer 1.

Actinic light (white light) from a suitable source 6 is then passed through the sandwich to form a positive image on photographic positive printing paper 4 in accordance with standard photographic printing technique. Although FIGURE 1 shows irradiation of the sandwich from above, it will be obvious that irradiation may be effected from any angle for side of the sandwich so long as the actinic light passes through the masked sandwich.

By virtue of the foregoing dodging procedure a positive image is produced having substantially improved small detail sharpness and contrast between small detail areas.

Example 3

FIGURE 2 of the accompanying drawing illustrates another embodiment of the invention. In reference thereto, 1 is a photochromic layer formed in this case by coating the emulsion side 3 of a conventional unexposed photographic negative comprising a transparent support sheet 2 and an unexposed silver halide photographic emulsion 3, with a photochromic coating solution substantially as described in Example 1. The coating is done, of course, in a photographic dark room. Thereafter, a negative image is formed on the film which is masked and then printed while dodging in substantially the same manner as described in Example 2.

No problems are encountered in the foregoing examples with registration of the photochromic masking layer and photographic negative even when masking is repeated. Moreover, by regulating the thickness of the transparent supporting sheet and/or photochromic layer as well as intensity and time of light exposure, various degrees of dodging are obtained in a perfectly uniform manner for each of the prints made from film of the same dimensions.

I claim:
1. A method of photographic dodging which comprises, (1) exposing to visible light a photographic film comprising in permanent integral laminate arrangement a substantially transparent support sheet, a photochromic layer, and an unexposed silver halide photographic emulsion layer, said photochromic and silver halide layers being in direct contact, to form an image in said silver halide emulsion, (2) developing said image in said silver halide emulsion, (3) passing ultraviolet light through said image bearing layer to form a masking image in said photochromic layer, and (4) passing visible light through the masked image to form a positive image having improved contrast range.

2. The method of claim 1 wherein the photochromic layer is in direct contact with the support sheet.

3. The method of claim 1 wherein the photographic emulsion is in direct contact with the support sheet.

4. The method of claim 1 wherein said positive image is formed on a photosensitive sheet.

References Cited

UNITED STATES PATENTS

| 3,105,761 | 10/1963 | Foris. | |
|---|---|---|---|
| 3,160,504 | 12/1964 | Montani. | |
| 2,036,369 | 4/1936 | Simjian | 96—68 |

FOREIGN PATENTS 891,992  8/1958  Great Britain.

OTHER REFERENCES

Printed-Out Masks, Camera, May, 1964, pp. 37, 96–44.

Novel photochromic Systems for Photographic Masking, Phot. Sci. and Eng., vol. 9, No. 1, January-February, 1965, pp. 67–71, 96–44.

J. TRAVIS BROWN, *Primary Examiner.*

C. E. DAVIS, *Assistant Examiner.*

U.S. Cl. X.R.

96—68, 90